(12) United States Patent
Jenssen

(10) Patent No.: US 7,176,882 B2
(45) Date of Patent: Feb. 13, 2007

(54) HAND HELD CONTROL DEVICE WITH DUAL MODE JOYSTICK FOR POINTING AND SCROLLING

(76) Inventor: Ken Alvin Jenssen, Gammeltroa 6, 6523 Frei (NO)

( * ) Notice: Subject to any disclaimer, the term of this patent is extended or adjusted under 35 U.S.C. 154(b) by 197 days.

(21) Appl. No.: 10/494,360

(22) PCT Filed: Nov. 12, 2001

(86) PCT No.: PCT/NO01/00447

§ 371 (c)(1), (2), (4) Date: May 11, 2004

(87) PCT Pub. No.: WO03/042807

PCT Pub. Date: May 22, 2003

(65) Prior Publication Data

US 2005/0001786 A1 Jan. 6, 2005

(51) Int. Cl.
*G09G 5/08* (2006.01)
(52) U.S. Cl. .................... 345/156; 345/161; 345/167
(58) Field of Classification Search ........ 345/156–167; 200/6 A
See application file for complete search history.

(56) References Cited

U.S. PATENT DOCUMENTS

| | | | |
|---|---|---|---|
| 6,489,948 B1* | 12/2002 | Lau | 345/163 |
| 6,707,443 B2* | 3/2004 | Bruneau et al. | 345/156 |
| 6,816,151 B2* | 11/2004 | Dellinger | 345/167 |
| 6,822,638 B2* | 11/2004 | Dobies et al. | 345/161 |
| 6,950,092 B2* | 9/2005 | Buss | 345/161 |
| 2001/0000125 A1* | 4/2001 | Zimmerman et al. | 345/161 |
| 2001/0006143 A1* | 7/2001 | Sato | 200/6 A |
| 2002/0075233 A1* | 6/2002 | White et al. | 345/161 |
| 2002/0140665 A1* | 10/2002 | Gordon | 345/156 |
| 2002/0171623 A1* | 11/2002 | Chen | 345/156 |

* cited by examiner

*Primary Examiner*—Bipin Shalwala
*Assistant Examiner*—David L. Lewis
(74) *Attorney, Agent, or Firm*—Dennison, Schultz & MacDonald

(57) ABSTRACT

Control device (computer mouse) for moving a visual pointer on a display constituting part of a user interface for computer equipment. The control device is designed to be used hand held free of support from any surface, as the movement of the pointer in two dimensions takes place by means of a guide pin), a so-called joy-stick. The guide pin preferably has a double function so that it may also be used for scrolling the display. The control device may include an attachment for the user's hand or wrist, and may be integrated with a telephone receiver or with a remote control for a television set or the like.

10 Claims, 2 Drawing Sheets

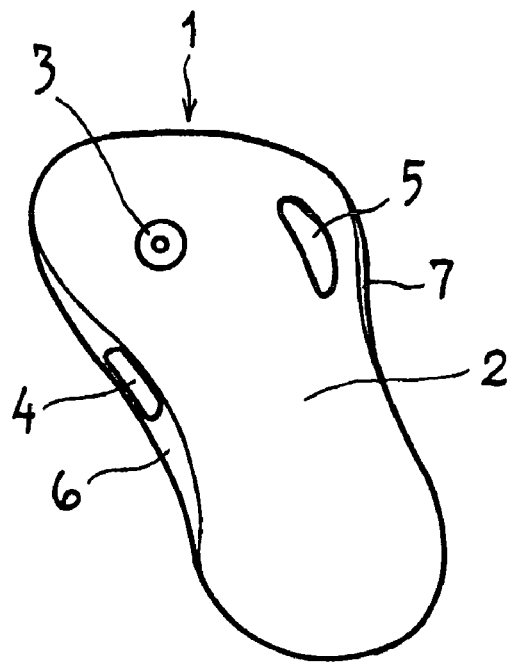
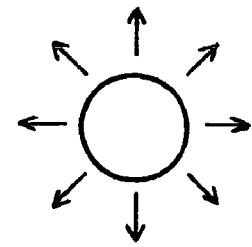
Fig.1
Fig.2
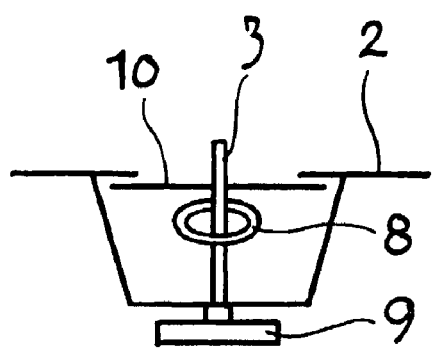
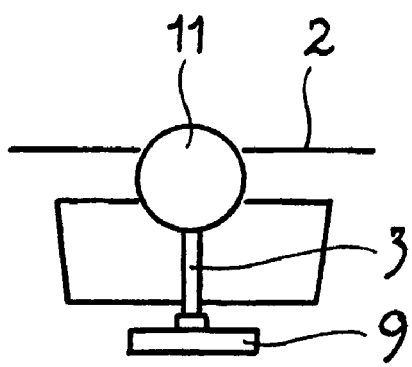
Fig.3a
Fig.3b

HAND HELD CONTROL DEVICE WITH DUAL MODE JOYSTICK FOR POINTING AND SCROLLING

This application is a filing under 35 USC 371 of Pct/ NO01/00447, filed Nov. 12, 2001.

BACKGROUND OF THE INVENTION

The present invention relates to a control device for moving a pointer on a computer display and to activate choices in computer software by click, drag and double-click actions. Control devices of this type are commonly called mice or computer mice.

A wide variety of computer mice are known, most of them sharing the common feature that they rest on a surface with a rolling ball that controls the movement of a pointer on a computer display. In addition most mice have at least two buttons, a right and a left button, for activating software and choices within software.

A variant of this type of mouse comprises an imaginary ball for the controlling of the pointer movement, based on e.g. optical determination of the mouse position on a particular surface. Another variant is designed to rest stationary on a surface and comprises a ball on its top surface, said ball being intended to be rolled by the users thumb or other fingers.

A control device for a cursor or the like of a computer is described in PCT patent application PCT/N099/00054. The control device may comprise a (guide) stick. There is nothing in this application, however, indicating that the control device is intended for use independent of a supporting surface. To the contrary, as disclosed by the drawings, the device is designed and dimensioned for use on a supporting surface. The claims are thus generally directed to the functionality that the control device shall provide a suitable support for the hand, that is to say that the hand is supposed to rest against the control device which in turn rests against a supporting surface.

While the mice according to the prior art fulfills the tasks they are intended to in a way that is mainly satisfactory, they still are bothered with some practical disadvantages.

The most troublesome disadvantage with prior art computer mice is the pronounced tendency of strain injuries in hands and underarms connected to extensive use of such mice, commonly known as "mice strain injury".

Other disadvantages are that they require a large free area on the desktop, an area which might otherwise be utilized for other purposes.

A further aspect with the invention is that future integration of different kinds of computer and telecom equipment will require use of such control devices (computer mice) in situations where the user is not located at an office accommodation. It should thus be mentioned that access to data networks through television and telephone will change people's habits with regards to "data" in a way such that there will be a need for other types of control devices than the types previously known.

SUMMARY OF THE INVENTION

It is thus an object of the invention to provide a computer mouse that meets future requirements with regard to ergonomics.

It is further an object to provide a computer mouse that involves a lowest possible risk of strain injuries.

It is further an object to provide a computer mouse that is well suited as an interface for data in various forms, such as via a terminal, via telephone and via television.

It is a still further object to provide a computer mouse where the need for a supporting surface is eliminated.

Said purposes are achieved by a control device (computer mouse) for controlling of a visual pointer on a display constituting part of a user interface for computer equipment, where the control device is designed to be used hand-held without support from any surface, and that the controlling movement of the pointer in two dimensions takes place with the aid of a guide pin or a so-called joy-stick.

Preferred embodiments of the invention are disclosed by the dependent claims.

Use of joy-sticks in data is well known in connection with controlling different types of functionality in games etc., but has to the inventor's knowledge not been proposed as a means for improving the ergonomics of traditional computer mice or for making them independent of a supporting surface.

The core of the invention is that substantial ergonomical benefits of such control devices are obtained with simple means. At the same time a control device that is far better suited for the future data situation is obtained, a situation where data will be transmitted by telephones and television sets.

BRIEF DESCRIPTION OF THE DRAWINGS

The invention shall now be described in further detail with reference to the enclosed drawings.

FIG. 1 shows a preferred embodiment of the control device according to the invention, FIG. 2 shows simplified in a top view the directional choices of the unit 3 of FIG. 1, FIG. 3a shows in a side sectional view of the unit 3, FIG. 3b shows in a side sectional view another variant of the unit 3.

DESCRIPTION OF THE PREFERRED EMBODIMENTS

Figure 4:
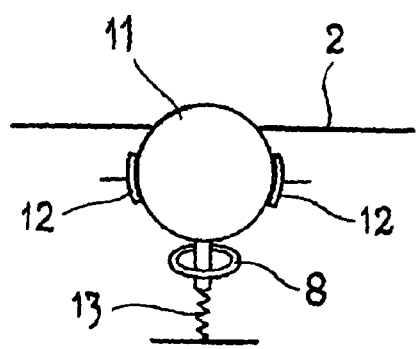
FIG. 4 shows further details of the variant shown in FIG. 3b.

FIG. 1 shows a control device 1 according to the invention comprising a top surface or a top cover 2, a guide pin 3, a left mouse-button 4 (for primary choices in software) and a right mouse-button 5 (for secondary choices in software). The left mouse-button 4 is localized to a side surface 6 of the control device where the thumb naturally will rest when the device is being used, while the opposite side surface 7 will be supported by the two outermost fingers of the same hand. FIG. 1 depicts a control device for right-handed, while a corresponding one for left-handed people naturally will be laterally reversed (like FIG. 1 seen in a mirror).

The guide pin 3 for moving the pointer (not shown) on a display or the like to which the control device is connected, is moveable in all directions parallel to the surface of the top cover, as indicated by FIG. 2, and is thereby able to move the logically corresponding pointer to any position on a twodimensional display, as traditionally done by rolling the mouse on a supporting surface.

FIG. 3a shows the guide pin 3 in a side sectional view, showing that the base or support for the guide pin is retracted in comparison to the top cover surface 2. A cap 10 is attached to the guide pin, giving the top cover 2 the impression of being continuous regardless of the positioning of the guide pin. FIG. 3a shows a further preferred detail, that the guide pin's base is resting on a one-way push-button (selector switch) 9 that with a click may give the guide pin an addtional function, the ability to scroll the display up/down or right/left. With a new click of the selector switch 9 the guide pin 3 resumes control of the pointer. FIG. 3a also shows means 8 in the form of a coil or potentiometer that with contact to the guide pin together with conventional electronics, decides the direction of the pointer's movement on the display.

FIG. 3b shows a variant of the guide pin 3 in a side sectional view, where a sphere member 11 attached to the free end of the guide pin constitutes the visible part of the guide pin 3. As indicated by FIG. 4, the sphere member 11 is hinged in two pairs (one of which is visible in the figure) mutually opposite "gyro suspensions" 12, giving the sphere ability to rotate in any direction. Such rotational movement of the sphere 11 influences the guide pin in a manner principally similar to the embodiment of FIG. 3a. It is convenient to provide the guide pin 3 with equipment like a spring 13 or the like (FIG. 4) to ensure that it always seeks back to its centre position when it is released.

Whether only the top of the guide pin 3, the sphere member 11 or the entire guide pin 3 is visible over the top cover 2 is not decisive for the invention. What is vital is the new functionality provided by the new structure, enabling the user to operate the control device without any kind of table or supporting surface. It is however, preferred that the guide pin is retracted relative to the top cover 2 so that only part of it protrudes there above, as this is both ergonomically favourable and simple with regard to its manufacture. It is furthermore preferred that the free end of the guide pin 3 or the sphere 11 is made in a material providing a relatively high friction against the users finger, alternatively that this part is provided with grooves or a depression that provides better grip for a finger.

Figure 5:
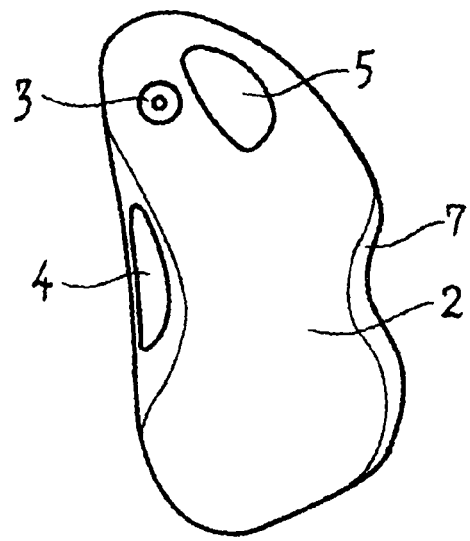
FIG. 5 shows principally the same as FIG. 1, but with an alternative design.

FIG. 5 shows a design variant of the control device according to the invention where the right mouse-button 5 is closer to the guide pin 3 than on the variant shown in FIG. 1. In addition the right lateral surface 7 or at least a part of this lateral surface is tapered substantially to facilitate the grip of right hands ring- and little finger. With regard to their function the variants of FIG. 1 and FIG. 5 are similar. Other variants may also occur, depending on requirements based on ergonomics etc. For instance is it preferred in some connections to provide the device with attachment means so that it may be temporarily attached to the user's hand or wrist, e.g. with straps, velcro fastenings or the like. For this purpose it will be convenient to extend the control device in the direction facing away from the end where the guide pin 3 is localized. Such an extension of the control device may either be part of its permanent design, or something detachable that is attached and removed according to needs.

Figure 6:
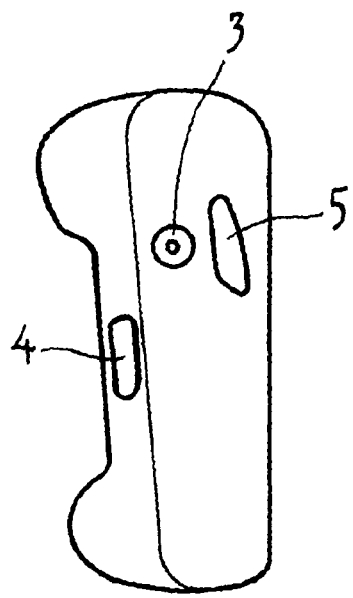
FIG. 6 shows an alternative embodiment of the control device according to the invention.

FIG. 6 shows a control device according to the invention, integrated with a telephone receiver, intended for data operation via telephone. The guide pin 3 and the buttons 4 and 5 are positioned for the best possible ergonomics, which for the shown embodiment is on the opposite side of the telephone receiver relative to microphone and loadspeaker.

Figure 7:
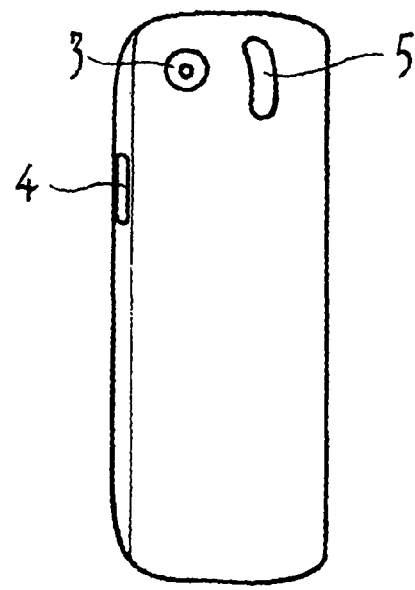
FIG. 7 shows a still further embodiment of the control device according to the invention.

FIG. 7 shows a control device according to the invention integrated in a remote control for a television set or the like, arranged on the opposite side relative to the buttons for the primary functions of the remote control.

Whether the transfer of signals to and from the control device takes place by means of cable or wireless is not significant for the present invention. It will however readily by understood that in connections with data over a television set, a wireless connection will constitute a preferred implementation of the invention.

While it normally will be a right button and a left button of the type of contol device herein described, it is also possible that the functionality of these two buttons may be combined in one button only. It is also possible for some dedicated utilizations of such control devices, to avoid completely the use of click buttons (left and right). The present invention is thus not limited to control devices with any particular number of click-buttons for the activation of choices in software.

The member 8 that together with the guide pin 3 decides the direction of the pointer's movement or the scrolling direction, is shown in the Figures as a coil/potentiometer. Other kinds of members may however be applied for cooperation with the guide pin 3, and the present invention is not limited to coil/potentiometer for this function.

While the guide pin 3 for the shown embodiments are arranged on or at a top surface of the control device 1, it is also possible to localize the guide pin on a lateral surface, e.g. the lateral surface facing away from the user. As the control device according to the invention may be held in any position, the term "top surface" may seem somewhat ambiguous, and in this connection it should be noted that by top surface is meant the surface, which normally lies against the palm of the users hand. Also the left 4 and the right button 5 may be localized different from the embodiments shown by the figures. With use of small control devices 1 the users hand may enclose the control device almost entirely, and the natural localization of the buttons in such a case would be at the side opposite to the palm of the user's hand, while the guide pin 3 in case most naturally would be arranged either at a lateral surface or on the same surface as the buttons 4 and 5.

It should be emphasized that embodiments other than these described above may be implemented within the frame of the invention, which is limited only by the attached claims.

The invention claimed is:

1. A control device for controlling a visual pointer on a computer display means, comprising:
   a control unit constructed and arranged to be used hand held and free of support from a surface;
   a dual function joy stick means comprising a guide pin, for controlling movement of the pointer in two dimensions, and for scrolling;
   means for alternating joy stick function between controlling movement of the pointer and scrolling, said means comprising a selector switch operationally connected to the guide pin; and
   at least one activation button separate from the joy stick means.

2. Control device as claimed in claim 1, wherein the guide pin rests on the selector switch, such that pushing on the guide pin activates the switch.

3. Control device as claimed in claim 1, wherein the guide pin is localized at a top surface of the control unit and is constructed and arranged for operation with an index finger.

4. Control device as claimed in claim 1, wherein guide pin comprises a base which is retracted relative to a top surface cover of the control unit so that only part of the guide pin protrudes from the top surface cover.

5. Control device as claimed in claim 1, wherein the at least one activation button comprises a right button and a left button for starting and activating choices in software.

6. Control device as claimed in claim 5, wherein the left button is arranged mainly at a lateral surface of the control unit and is constructed and arranged for operation with a thumb.

7. Control device as claimed in claim 6, wherein the right button is arranged mainly at the top surface of the control unit to a side of the guide pin, and is constructed and arranged for operation with a middle finger.

8. Control device as claimed in claim 5, wherein the right button is arranged mainly at a top surface of the control unit to a side of the guide pin, and is constructed and arranged for operation with a middle finger.

9. Control device as claimed in claim 1, wherein the control unit has a dimension and shape such that it may easily be held in one hand independent of position of the hand relative to the user or relative to an interface to which the control device transfers information.

10. Control device as claimed in claim 1, wherein transfer of signals from the control device is wireless.

* * * * *